(12) United States Patent
Light

(10) Patent No.: US 10,932,461 B2
(45) Date of Patent: Mar. 2, 2021

(54) AGRICULTURAL SPRAYER BOOM ASSEMBLY WITH MULTIPLE ELECTRONICALLY DAMPENED BREAKAWAY DEVICES HAVING INCREASED PERMITTED UPWARD DEFLECTION

(71) Applicant: 4-L Manufacturing, Inc., Lisbon, IA (US)

(72) Inventor: Dan Light, Lisbon, IA (US)

(73) Assignee: 4-L Manufacturing, Inc., Lisbon, IA (US)

(*) Notice: Subject to any disclaimer, the term of this patent is extended or adjusted under 35 U.S.C. 154(b) by 0 days.

(21) Appl. No.: 16/709,429

(22) Filed: Dec. 10, 2019

(65) Prior Publication Data

US 2020/0113168 A1 Apr. 16, 2020

Related U.S. Application Data

(63) Continuation of application No. 15/986,561, filed on May 22, 2018, now Pat. No. 10,499,631, which is a continuation of application No. 15/622,745, filed on Jun. 14, 2017, now abandoned, which is a continuation of application No. 14/488,563, filed on Sep. 17, 2014, now Pat. No. 9,681,654, which is a continuation of application No. 13/362,504, filed on Jan. 31, 2012, now Pat. No. 8,864,048.

(Continued)

(51) Int. Cl.
*A01M 7/00* (2006.01)
*B05B 1/20* (2006.01)
*B05B 3/12* (2006.01)
*E05D 7/00* (2006.01)

(52) U.S. Cl.
CPC ............. *A01M 7/0078* (2013.01); *B05B 1/20* (2013.01); *B05B 3/12* (2013.01); *E05D 7/00* (2013.01); *Y10T 16/538* (2015.01)

(58) Field of Classification Search
CPC .. B05B 1/205; B05B 1/20; B05B 3/02; B05B 3/14; B05B 3/12; A01G 25/09; E01C 19/16; E01H 3/02; A01M 7/0078; E05D 7/00; Y10T 16/538
USPC ............... 239/159, 161, 163, 166, 167, 172; 91/167 R, 169, 196, 206–209; 60/469; 92/52, 51, 53
See application file for complete search history.

(56) References Cited

U.S. PATENT DOCUMENTS 6,027,039 A 2/2000 Mercil
6,293,475 B1 9/2001 Sobolik
(Continued)

*Primary Examiner* — Justin M Jonaitis
(74) *Attorney, Agent, or Firm* — Simmons Perrine Moyer Bergman PLC

(57) ABSTRACT

According to one embodiment, there is provided a breakaway hinge for an expandable boom on an agricultural vehicle. The boom includes a first and a second section combined in a manner to allow the second section to move with respect to the first section when the second section encounters an obstruction. A breakaway hinge is provided between the first and the second section, and includes a first pivot member attached to the first section at an angle α with respect to a vertical line and a second pivot member attached to the second section at an angle θ with respect to the vertical line. A connecting member holds the first pivot member with respect to the second pivot member.

8 Claims, 8 Drawing Sheets

Related U.S. Application Data

(60) Provisional application No. 61/452,358, filed on Mar. 14, 2011.

(56) References Cited

U.S. PATENT DOCUMENTS

| | | |
|---|---|---|
| 6,454,294 B1 | 9/2002 | Bittner et al. |
| 6,719,213 B1 | 4/2004 | Ferguson |
| 7,740,190 B2 | 6/2010 | Peterson et al. |
| 8,864,048 B1 | 10/2014 | Light |
| 9,681,654 B2 | 6/2017 | Light |
| 10,499,631 B2 * | 12/2019 | Light ................... B05B 3/12 |
| 2007/0131791 A1 * | 6/2007 | Peterson ............. A01M 7/0078 |
| | | 239/166 |
| 2012/0237284 A1 | 9/2012 | Bouten |

\* cited by examiner

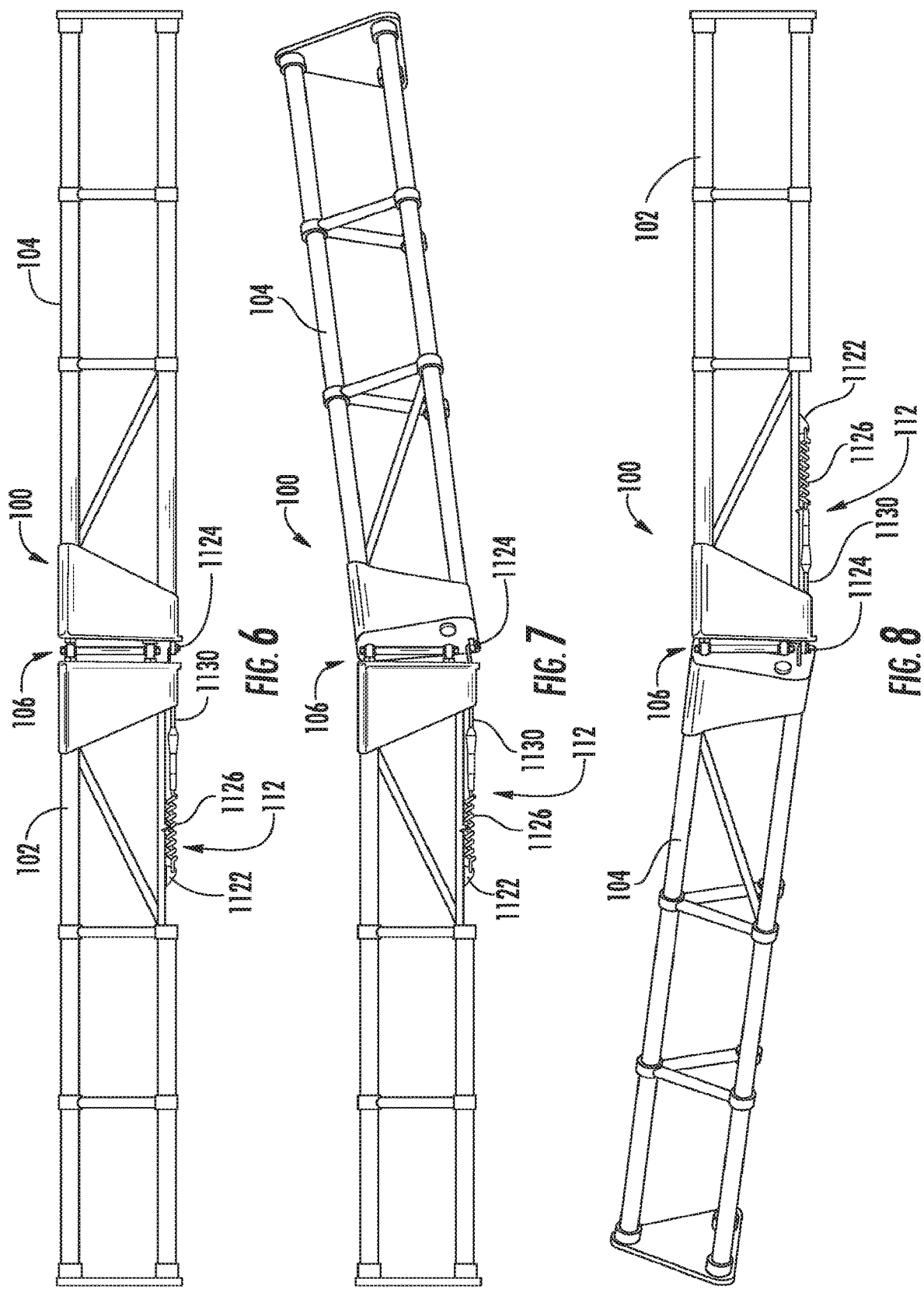

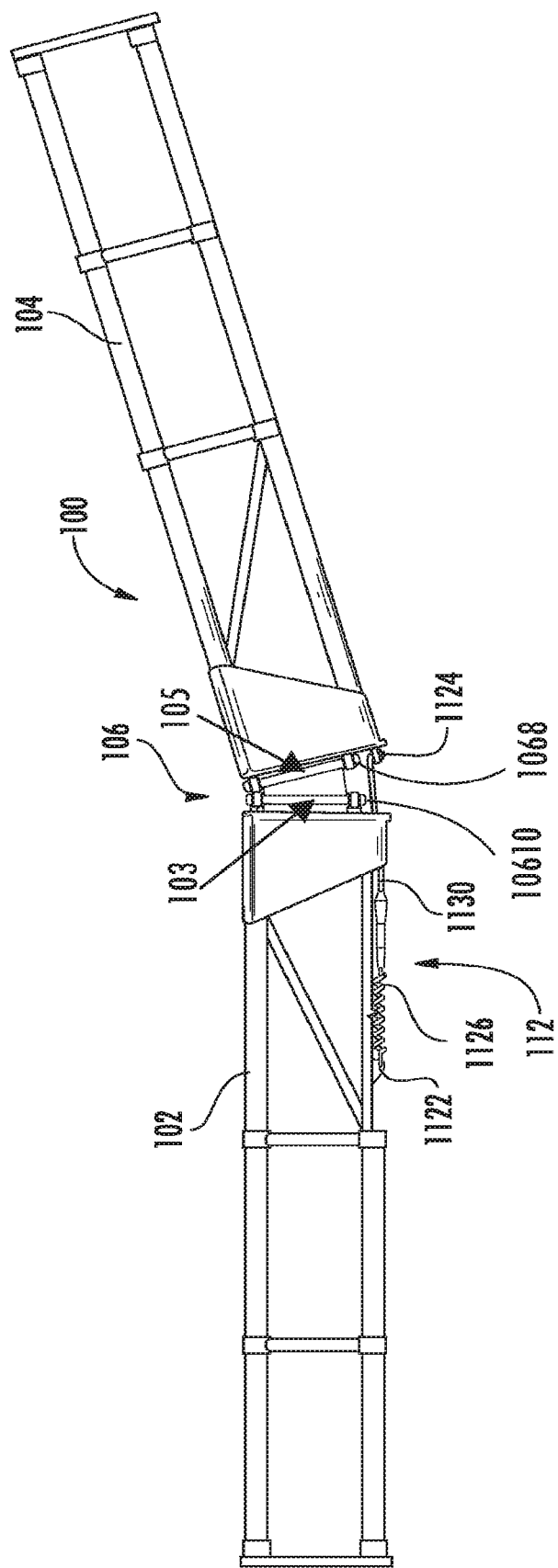

AGRICULTURAL SPRAYER BOOM ASSEMBLY WITH MULTIPLE ELECTRONICALLY DAMPENED BREAKAWAY DEVICES HAVING INCREASED PERMITTED UPWARD DEFLECTION

CROSS REFERENCE TO RELATED APPLICATIONS

This application claims priority to U.S. Provisional Application No. 61/452,358 filed Mar. 14, 2011, the entirety of which is incorporated by reference herein. This application is also a continuation of U.S. patent application Ser. No. 13/362,504 filed Jan. 31, 2012, now U.S. Issued U.S. Pat. No. 8,864,048, issued on Oct. 21, 2014, the entirety of which is incorporated by reference herein. This application is also a continuation of U.S. patent application Ser. No. 14/488,563 filed Sep. 17, 2014, now U.S. Issued U.S. Pat. No. 9,681,654, issued on Jun. 20, 2017, the entirety of which is incorporated by reference herein. This application is also a continuation-in-part of U.S. patent application Ser. No. 15/622,745 filed Jun. 14, 2017, now abandoned. This application is also a continuation of U.S. patent application Ser. No. 15/986,561 filed May 22, 2018.

BACKGROUND

Liquid chemicals, such as herbicides and pesticides, are commonly applied by use of a sprayer having long booms. This sprayer may be attached to a tractor, placed in the rear of a pickup, or be of a self-propelled nature. Typically, these sprayers will have long booms reaching out on either side to increase the area sprayed with each pass of the vehicle. As the boom length extends out from the vehicle pulling the sprayer, the ends of the booms are subject to more up and down movement as the vehicle travels over small bumps and ruts and thus, moves from side to side. Another problem with lengthening the booms is the tendency for the driver to misjudge distances from obstacles such as power poles, trees and fences, thus running the end of the boom into the obstacles, possibly damaging the boom and the obstacle, and causing costly down time.

The previously disclosed boom assemblies fail to disclose a breakaway mechanism that holds the inner and outer boom extensions firmly with respect to each other, while allowing the outer boom extension to move away from an obstruction regardless of the direction of travel of the sprayer or flex upward in the vertical plane to clear an obstruction.

SUMMARY

According to one embodiment, there is provided a breakaway hinge for an expandable boom on an agricultural vehicle. The boom includes an inner (first) and an outer (second) section combined in a manner to allow the outer section to move with respect to the inner section when the outer section encounters an obstruction. A breakaway hinge is provided between the inner and the outer sections, and includes a first pivot member attached to the inner section at an angle $\alpha$ with respect to a vertical line and a second pivot member attached to the outer section at an angle $\theta$ with respect to the vertical line. A connecting member holds the first pivot member with respect to the second pivot member. While the first pivot member remains fixed to the inner section, the outer section can pivot on either one of the first and the second pivot members. When the outer section encounters the obstruction as the agricultural sprayer vehicle is moving in a forward motion, the second section is moved upward and rearward with respect to the inner section, and thus away from the obstruction at the angle $\theta$. When the second section encounters the obstruction as the agricultural sprayer vehicle is moving in a reverse motion, the second section is moved upward and forward with respect to the inner section, and thus away from the obstruction at the angle $\alpha$.

A biasing element is provided for holding the inner and the outer sections together in a normal state position. When the second section encounters the obstruction and moves upward and away from the obstruction, the biasing element urges the second section back to the normal state position as the obstruction is cleared.

In another embodiment, two height adjustment mechanisms are provided, one opposite each of the two pivoting members. The height adjustment mechanisms engage their corresponding pivot members to position the inner and outer sections relative to each other.

BRIEF DESCRIPTION OF THE DRAWINGS

FIG. 6 is a front view of the embodiment of FIG. 1 with the outer and inner booms in the steady state position.

FIG. 7 is a front view of the embodiment of FIG. 1 with the outer boom moved upward and rearward with respect to the inner boom, as though the outer boom encountered an obstruction as the vehicle is traveling forward.

FIG. 8 is a rear view of the embodiment of FIG. 1 with the outer boom moved upward and rearward with respect to the inner boom, as though the outer boom encountered an obstruction as the vehicle is traveling forward.

FIG. 9 is a detail view of the embodiment of FIG. 1 showing the outer boom moved upward from the inner boom.

DETAILED DESCRIPTION

Disclosed is a breakaway mechanism for an expandable boom attached to an agricultural vehicle. Such an agricultural vehicle is usually used for applying liquid chemicals to fields, such as herbicides and pesticides. The expandable boom is mounted on a trailer or a self-propelled vehicle that supports a main support frame, which supports right and left foldable boom assemblies (as facing forward on the vehicle) that extend outward from the vehicle. One boom assembly is described hereinafter with the understanding that the right and left boom assemblies can be the same or mirror images of each other.

Figure 1:
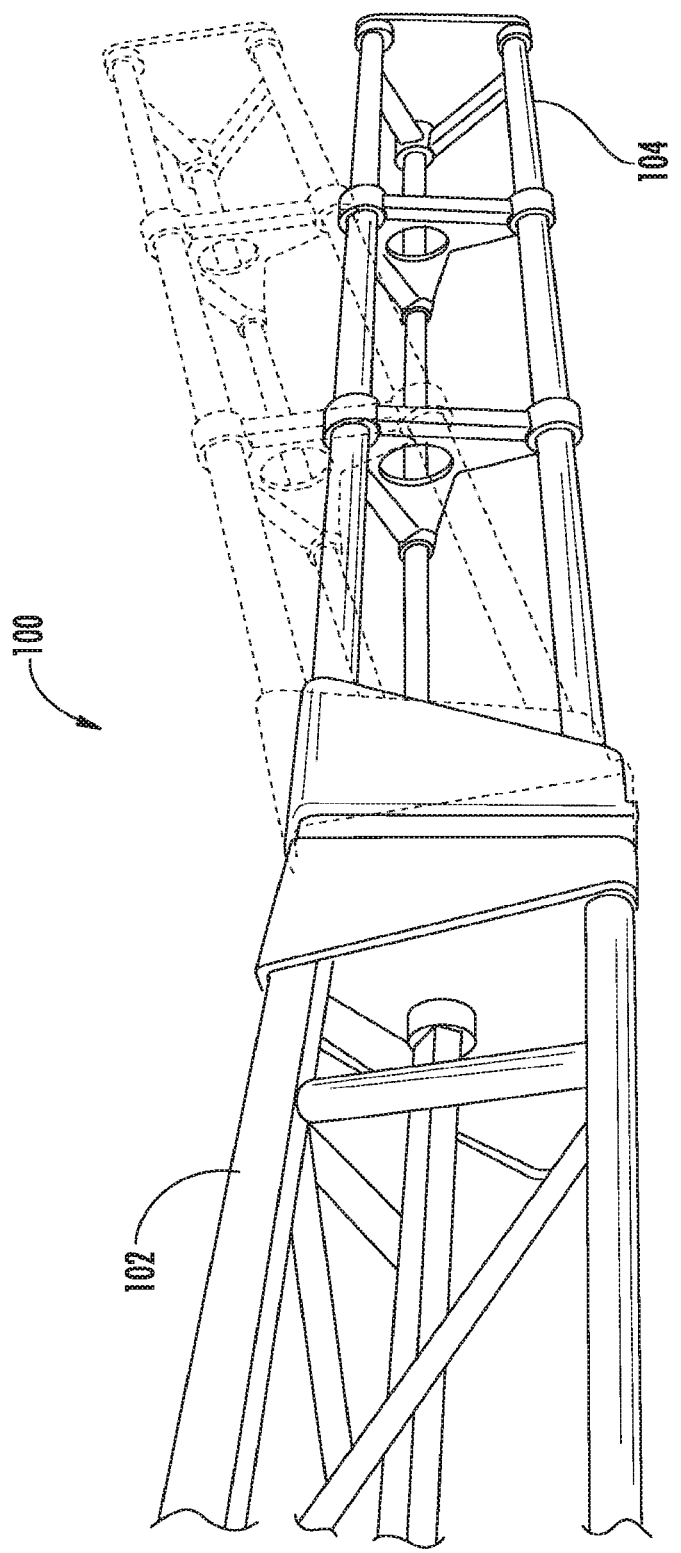
FIG. 1 is a perspective view of a breakaway boom showing how the outer boom moves with respect to the inner boom.

FIG. 1 shows a portion of a boom assembly 100, including an inner boom assembly 102 connected to an outer boom assembly 104 with a phantom image illustrating a path of travel for outer boom assembly 104 as it moves away to clear an obstruction. Boom assembly 100 includes inner boom assembly 102, which is attached to the agricultural vehicle (not shown) for rotational movement between an extended position substantially perpendicular to a direction of travel and preferably, a folded position substantially parallel with a direction of travel. The inner boom can also fold in other directions. Attached to the outer end of the inner boom assembly 102 is outer boom assembly 104 that extends the length of the foldable inner boom assembly 102. In one embodiment, multiple extension boom assemblies can be provided in sequence to extend the area sprayed with each pass of the vehicle.

Figure 2:
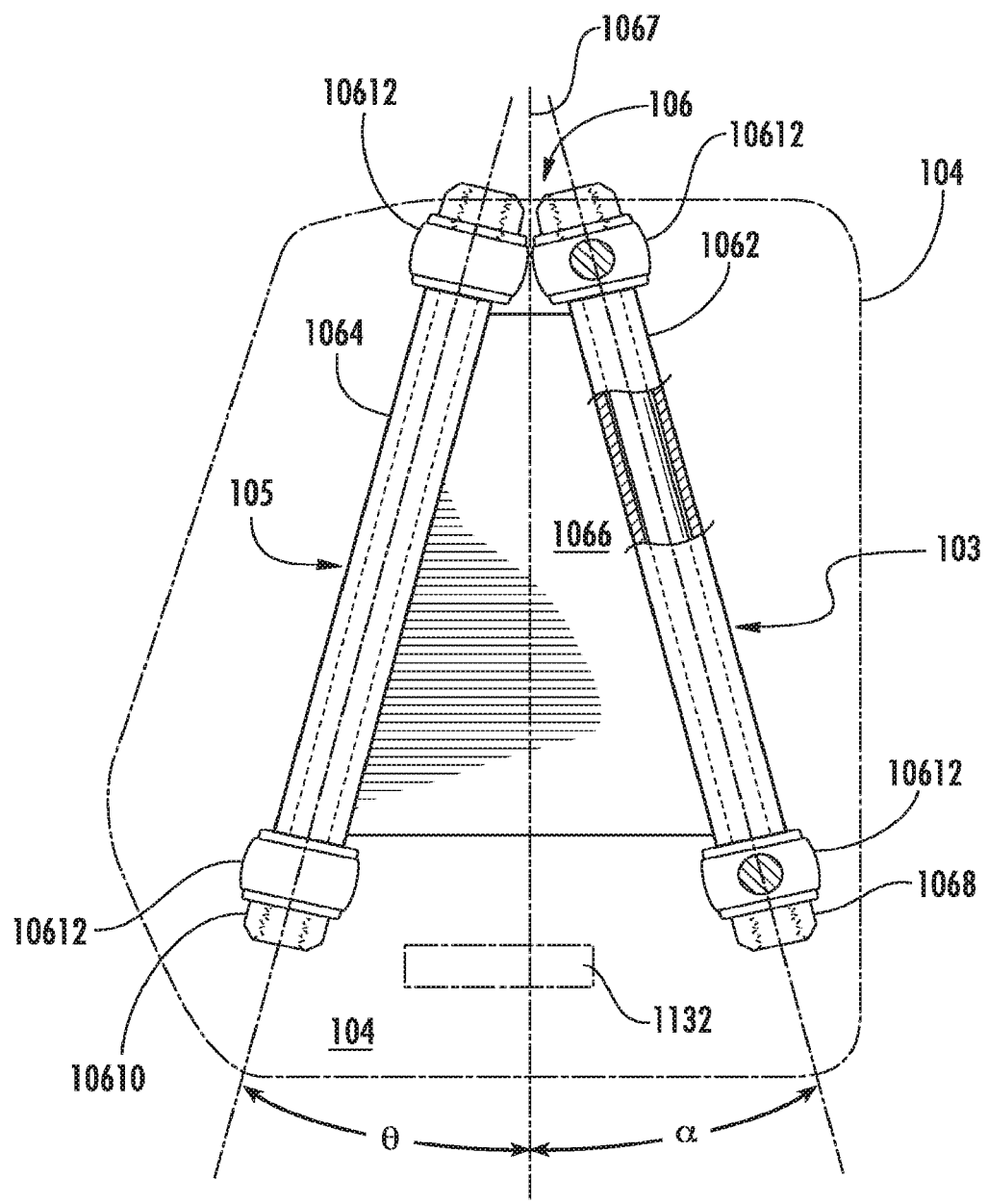
FIG. 2 is a cut-away view toward the outer boom of the embodiment, shown in FIG. 1, showing a breakaway hinge.

Between inner boom assembly 102 and outer boom assembly 104 (or, alternatively the outermost extension assemblies) is a breakaway hinge 106, shown in FIG. 2, that allows outer boom assembly 104 to pivot to clear an obstruction. Breakaway hinge 106 can also be employed between the other inner extension boom assemblies.

Breakaway hinge 106 includes an A-frame structure defined by two cylindrical rod carrying tubes 1062, 1064 attached by a generally triangular plate 1066 positioned therebetween. FIG. 2 is a sectional view facing outer boom 104 and showing breakaway hinge 106 attached to outer boom assembly 104. Two pivoting rods 1068, 10610 are positioned in rod carrying tubes 1062, 1064, respectively. Pivoting rod 1068 is attached to inner boom assembly 102 and pivoting rod 10610 is attached to outer boom assembly 104.

Rod carrying tubes 1062, 1064 are attached to plate 1066 at an angle α and an angle θ, respectively, with respect to a centerline 1067 extending through plate 1066. Rod carrying tubes 1062, 1064, and thus pivoting rods 1068, 10610 are held with respect to centerline 1067 at the angles, a and θ. The angles, a and θ define the path of travel for outer boom assembly 104 in its forward and rearward motion. FIG. 2 shows angles α and θ at about 15 degrees. Either angle, however, can be adjusted to change the path of travel for outward boom assembly 104. Breakaway hinge 106 can be constructed as the weak point in boom assembly 100, so that it fails first. That way the cheaper component can be replaced without having to replace inner boom assembly 102 or outer boom assembly 104.

In operation, when outer boom assembly 104 encounters the obstruction as the agricultural sprayer vehicle is moving in a forward motion, outer boom assembly 104 is moved upward and rearward with respect to inner boom assembly 102, and thus away from the obstruction at the angle θ. When outer boom assembly 104 encounters the obstruction as the agricultural sprayer vehicle is moving in a reverse motion, outer boom assembly 104 is moved upward and forward with respect to inner boom assembly 102, and thus away from the obstruction at the angle α.

Pivoting rods 1068 and 10610 can be made from ⅝" round bar threaded on each end with a smooth shaft in the center. Four eyebolts, rod ends or heim joints, 10612 can be used with one on each end of pivoting rods 1068, 10610 to attach them to their respective boom assemblies 102, 104.

Figure 3:
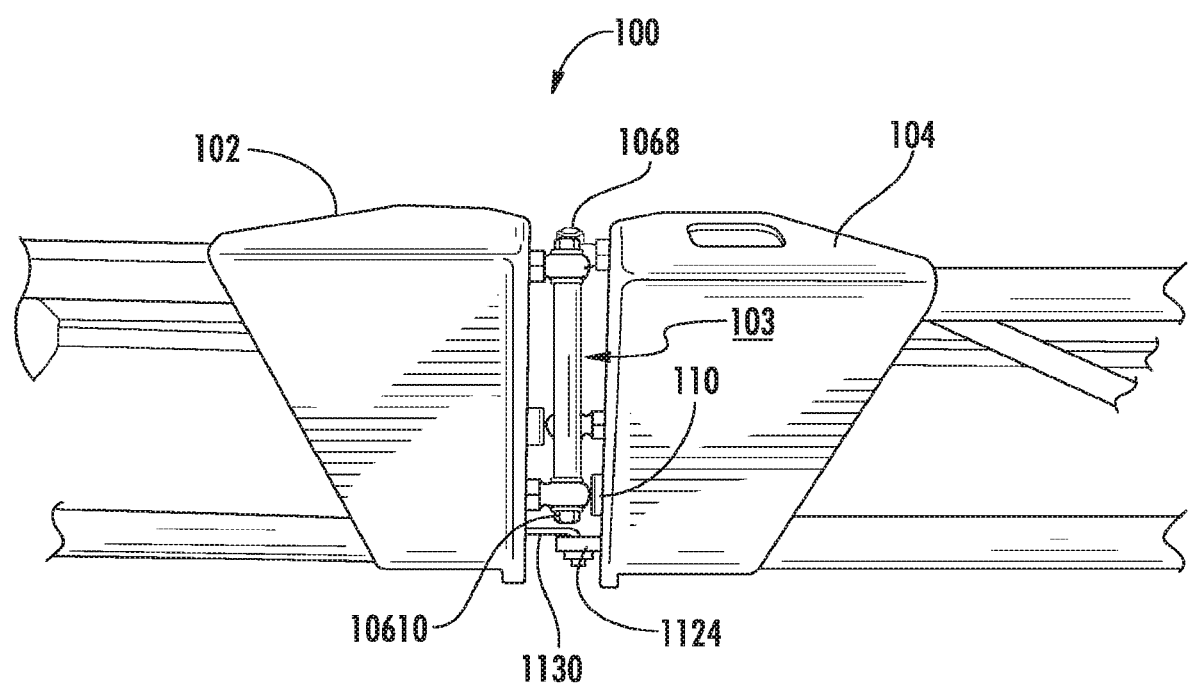
FIG. 3 is a front elevational view of the embodiment, shown in FIG. 1, with a breakaway mechanism, including the breakaway hinge attached.

A biasing element 112 (shown in FIGS. 6-9) is used to hold inner and outer boom assemblies 102, 104 in the normal state position. FIGS. 3 and 6 shows inner and outer boom assemblies 102, 104 in the normal state position where the respective boom assemblies are generally aligned with respect to each other. FIGS. 6-9 show biasing element 112 with a first end 1122 fixed to inner boom assembly 102 and a second end 1124 attached to outer boom assembly to provide a biasing force to hold boom assemblies 102, 104 in the normal state position. Biasing element 112 can include a heavy-duty extension spring 1126, a hydraulic, pneumatic, or electric cylinder as well as any form of mechanical biasing element. First end 1122 of extension spring 1126 is attached to inner boom assembly 102 and a second end 1128 of extension spring 1126 is attached to a cable 1130. Cable 1130 is directed through a hole at the end of inner boom 102 where it is attached to second end 1124 on outer boom assembly 104.

When outer boom assembly 104 encounters an obstruction, it moves away from the obstruction and is brought back by biasing element 112 to the normal state position after clearing the obstruction. FIG. 7 shows outer boom assembly 104 moved upward and rearward with respect to inner boom assembly 102, and thus away from the obstruction at the angle θ. FIG. 8 shows outer boom assembly 104 moved upward and forward with respect to inner boom assembly 102, and thus away from the obstruction at the angle α. In FIGS. 7 and 8, the biasing force from biasing element 112 brings outer boom assembly 104 back to the normal state position after the obstruction is cleared. The fact that biasing element 112 brings outer boom assembly 104 back to the normal state position means the operator does not have to leave his vehicle to re-align boom assembly 104 after it encounters an obstruction.

Biasing element 112 also holds the respective boom assemblies 102, 104 in the normal state position as the agricultural vehicle travels through the field encountering bumps and dips which might cause the respective boom assemblies 102, 104 to sway, bounce or vibrate.

Outer boom assembly 104 can also move solely in the vertical plane cue to the arrangement of biasing element 112 and breakaway hinge 106. FIG. 9 shows outer boom assembly 104 pivoted upward with respect to inner boom assembly 102. As outer boom assembly 104 is moved upward, pivoting rod 1068 pivots with respect to centerline 1067 and outer boom assembly 104 moves upward.

Figure 4:
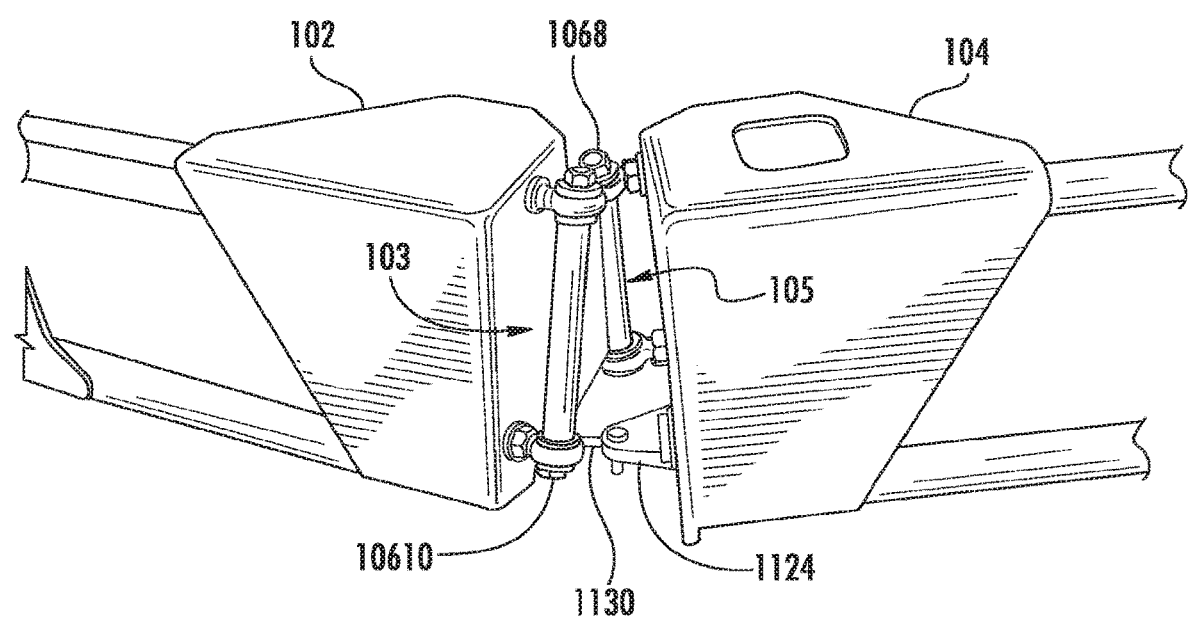
FIG. 4 is a front perspective view of the embodiment of FIG. 1, the outer boom moved upward and rearward with respect to the inner boom, as though the outer boom encountered an obstruction as the vehicle is traveling forward.

FIGS. 4 and 7 show outer boom assembly 104 from the front side pivoting rearward and upward with respect to inner boom assembly 102 on pivoting rod 1068 as though clearing an obstruction while the vehicle is traveling forward. In this position, plate 1066 of breakaway hinge 100 is generally aligned perpendicular to inner boom assembly 102 and away from outer boom assembly 104.

Figure 5:
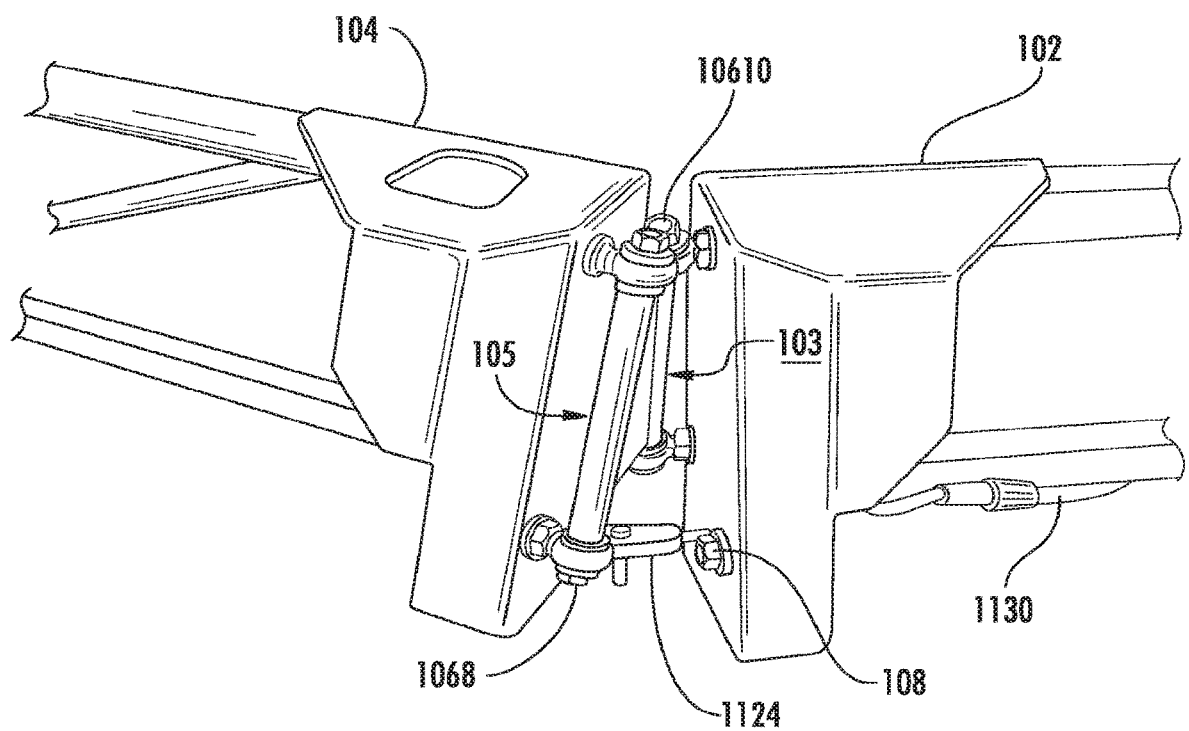
FIG. 5 is a rear perspective view of the embodiment of FIG. 1 showing the outer boom moved upward and forward with respect to the inner boom, as though the outer boom encountered an obstruction as the vehicle is traveling backward.

FIGS. 5 and 8 show outer boom assembly 104 from the backside pivoting frontward and upward on pivoting rod 10610 as though clearing an obstruction while the vehicle is traveling backward. Plate 1066 of breakaway hinge 100 is generally aligned perpendicular to outer boom assembly 104 and away from inner boom assembly 102.

Inner and outer boom assemblies 102, 104 are aligned with respect to each other in the vertical plane by two height adjustment mechanisms 108 (FIG. 5), 110 (FIG. 3), with each one positioned opposite of lower eyebolts, rod ends or heim joints 10612, of pivoting rods 1068, 10610, respectively. FIG. 4 shows outer boom assembly 104 pivoted with respect to inner boom assembly 102 on pivot rod 1068. Height adjustment 110 is combined to outer boom assembly 104 and illustrated apart from pivot rod 10610 because outer boom assembly 104 is pivoted away. FIG. 5 shows outer boom assembly 104 pivoted with respect to inner boom assembly 102 on pivot rod 10610. Height adjustment 108 is combined to inner boom assembly 102 and illustrated apart from pivot rod 1068 because outer boom assembly is pivoted away.

FIG. 3 shows inner and outer boom assemblies 102, 104 in a normal state position. The respective boom assemblies 102, 104 are generally aligned with each other due to the positioning of height adjustments 108, 110. Height adjustments 108, 110 can be adjusted in and out of their respective extensions to affect the leveling of the boom assemblies 108, 110 with respect to each other and can be locked in the desired position in a conventional manner with washer stacks and/or lock nuts or in other ways known to those skilled in the art.

In an alternative embodiment, pivoting rods 1068, 10610 can be positioned parallel to each other and center line 1067. In this embodiment, outer boom assembly would pivot outward and not upward. A sensor is positioned on outer boom assembly 104 or between outer and inner boom assemblies 102 and 104, respectively, to alert the operator of movement of outer boom assembly 104 with respect to inner boom assembly 102 so he can stop the agricultural vehicle and move away from the obstruction. The sensor can be a limit switch or a pressure sensor that detects physical contact between the obstruction and outer boom assembly 104 or a proximity sensor to detect when the obstruction is near outer boom assembly 104 or when outer and inner boom assemblies 102 and 104 are moved away from each other, as well as any form of sensor. The sensor is connected to a visual or auditory alarm in the cabin of the agricultural vehicle to alert the driver when outer boom assembly 104 encounters an obstruction.

In an alternate embodiment of the present invention, the breakaway device of FIG. 2 can be changed significantly. FIG. 2 shows the length of rods 1068 and 10610 are substantially longer than half the dimension of centerline 1067 on the face of the end of boot assembly 104. In a new embodiment, the length of rods 1068 and 10610 would be less than half the dimension of centerline 1067. This would allow for larger angle α with respect to the vertical line and an angle θ with respect to the vertical line, especially if the separation distance remains similar between eyebolts, rod ends or heim joints 10612. In this new embodiment, the material for 1066 would be at least 50% thicker, but in some embodiments at least 100% thicker than the industry standard ¼ inch. This configuration permits a higher range of permissible vertical deflections upon striking an obstruction.

Figure 10:
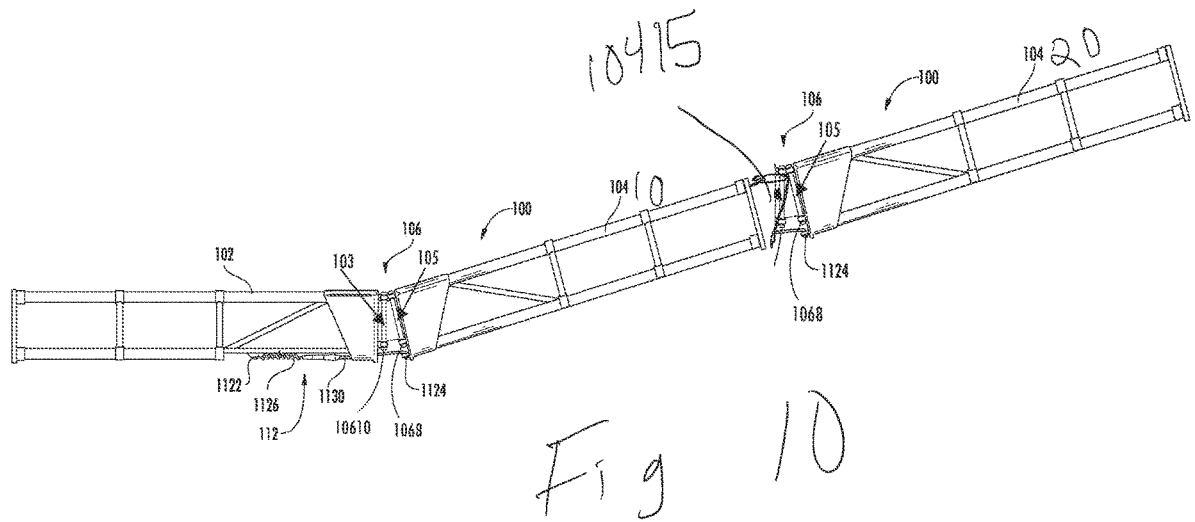
FIG. 10 shows an additional boom attached to the booms shown in FIGS. 1-9.

In still another embodiment, the boom assembly would contain a series of at least two boom segments which are coupled with a breakaway device at an interior end to another boom segment. Referring now to FIG. 10, which shows an additional outer boom assembly 10420 which is connected to the original outer boom assembly 104 or 10410 in FIG. 10. An angle adjustment wedge 10415 is shown so that a nearly identical outer boom assembly can mount to a vertical surface. This dual breakaway outer boom allows for less material being swung around during a breakaway of the outer most boom assembly 10420. This pivoting away and back of a smaller section allows for less wear and tear on the parts and increased reliability and mean time between failures.

In yet another embodiment, design would include, at each break away device, an electronically controlled dampening system. It would function similar to anti-skid systems available in cars and trucks. The control for this device could be incorporated into the Automatic Height Control Systems (AHCS) that are standard on many new sprayers. Such as, "Norac", John Deere's "Boom Track", "OutTrack", "Out Back", "Raven" and others not named. Most AHCS use sonic sensors and proximity switches which control hydraulic cylinders to keep a sprayer boom at a predetermined height from the ground. This is to maintain a consistent spray coverage and help avoid collisions with the ground. When the breakaway encounters an obstruction and flexes out of alignment, a proximity sensor would determine which direction it went and employ an actuator from the opposite direction to receive it when the spring tension returned it to its original alignment. The purpose of this is to eliminate the "impact" or "snap back" when the breakaway boom returns to its original alignment. This "impact" over time causes premature wear and abuse to the rod ends. This impact also causes stress cracks in the aluminum materials of the breakaway boom.

This electronically driven actuator would have the ability to slow down the snap back over a much larger time period than the current high durometer urethane bumpers that merely cushion the breakaway just before impact and at a point of maximum velocity impact. This innovation takes advantage of the fact that the most powerful snap backs are when the breakaway pivots the most. This electronically controlled damming system could obtain some functionality from portions of the automatic height control systems. In these multi-breakaway segmented booms, the springs could be replaced with magnetic particle brakes or similar electronic devices for resisting movement.

Reference has been made to several components throughout this disclosure as though each component is a unique component. One skilled in the art will readily recognize, however, that the various linkages and joints can be incorporated into one or more linkages and joints thereby reducing or increasing the number of components.

Reference may also have been made throughout this disclosure to "one embodiment," "an embodiment," or "embodiments" meaning that a particular described feature, structure, or characteristic is included in at least one embodiment of the present invention. Thus, usage of such phrases may refer to more than just one embodiment. Furthermore, the described features, structures, or characteristics may be combined in any suitable manner in one or more embodiments.

While the present invention has been particularly shown and described with reference to exemplary embodiments thereof, it should be understood by those of ordinary skill in the art that various changes, substitutions and alterations can be made herein without departing from the spirit and scope of the invention as embodied by the appended claims and their equivalents.

What is claimed is:

1. An agricultural sprayer comprising:
    a first boom configured to be coupled to a vehicle;
    a second boom coupled to said first boom;
    a third boom coupled to said second boom; and
    a first hinge disposed between and coupled to said first boom and said second boom, the first hinge comprising:
        a first member attached to the first boom at a first angle with respect to a first upwardly oriented line;
        a second member attached to the second boom at a second angle with respect to the first upwardly oriented line; and
        a first connecting member to hold the first member with respect to the second member so that the second boom moves on one of the first and the second members, wherein as the second boom encounters an object as the first hinge is moving in a forward motion, the second boom is moved upward and away from the object, as the second boom encounters the object as the first hinge is moving in a reverse motion, the second boom is moved upward and away from the obstruction at a first reverse angle;

a second breakaway hinge disposed between and coupled to said second boom and said third boom to allow movement of said second boom away from an obstruction, the second breakaway hinge comprising:
  a third member attached to the second boom at a third angle with respect to a second upwardly oriented line;
  a fourth member attached to the third boom at a fourth angle with respect to the second upwardly oriented line; and
  a second connecting member to hold the third member with respect to the fourth member so that the third boom moves on one of the third and fourth members, wherein as the third boom encounters an object as the second hinge is moving in a forward motion, the third boom is moved upward and away from the object, as the third boom encounters the object as the second hinge is moving in a reverse motion the third boom is moved upward and away from the obstruction at second reverse angle.

2. The agricultural sprayer of claim 1 wherein said first member is the same as the third member and said second member is the same as the fourth member.

3. The agricultural sprayer of claim 1 wherein said first upwardly oriented line and said second upwardly oriented line are vertical lines.

4. The agricultural sprayer of claim 3 wherein said vertical lines are geometrically vertical lines which have zero directional deviation from each other.

5. An agricultural sprayer comprising:
a first boom configured to be coupled to a vehicle;
a second boom coupled to said first boom;
a third boom coupled to said second boom; and
a first connection disposed between and coupled to said first boom and said second boom to allow orientation of said second boom with respect to an obstruction, the first connection comprising:
  a first member attached to the first boom at a first angle with respect to a first line;
  a second member attached to the second boom at a second angle with respect to the first line;
  a first connecting member which is configured to hold the first member with respect to the second member so that the second boom moves on one of the first and the second members, and so that as the second boom encounters an object while the second boom is moving in a forward motion, the second boom is moved upward and rearward from the first boom, at a first angle; and
  said first connecting member is further configured so that if the second boom encounters an object when moving in a reverse motion, the second boom is moved upward and forward from the first boom at a second angle;

a second connection disposed between and coupled to said second boom and said third boom and configured to allow movement of said third boom away from said second boom, the second connection comprising:
  a third member attached to the second boom at a third angle with respect to a second line;
  a fourth member attached to the third boom at a fourth angle with respect to the second line; and
  a second connecting member to hold the third member with respect to the fourth member so that the third boom moves on one of the third and fourth members;
  wherein as the third boom encounters an object when moving in a forward motion, the third boom is moved upward and rearward or an infinite number of combinations thereof from the second boom, and when the third boom encounters the object when moving in a reverse motion the third boom is moved upward and forward or an infinite number of combinations thereof from the second boom.

6. The system of claim 5 wherein all points of capture between first boom and said second boom in said first connection remain continuously coupled between said first boom and said second boom.

7. An agricultural sprayer comprising:
a first boom configured to be coupled to a vehicle;
a second boom coupled to said first boom;
a third boom coupled to said second boom; and
a second connection disposed between and coupled to said second boom and said third boom and configured to allow orientation of said third boom with respect to said second boom, the second connection comprising:
  a first member attached to the second boom at a first angle with respect to a first line;
  a second member attached to the third boom at a second angle with respect to the first line; and
  a second connecting member to hold the first member with respect to the second member so that the third boom moves on one of the first and second members;
  wherein as the third boom encounters an object when moving in a forward motion, the third boom is moved along a path upward and rearward from the second boom, which path requires at least three orthogonal axes to define, and when the third boom encounters the object when moving in a reverse motion the third boom is moved along a path upward and rearward from the second boom, which path requires at least three orthogonal axes to define.

8. An agricultural sprayer comprising:
a first boom configured to be coupled to a vehicle;
a second boom coupled to said first boom; and
a connection disposed between said first boom and said second boom and including all points of capable contact therebetween, wherein said all points of capable contact being configured to remain continuously coupled between said first boom and said second boom while simultaneously allowing a change of orientation of said second boom with respect to an obstruction.

* * * * *